(12) United States Patent
Lippert et al.

(10) Patent No.: US 10,001,634 B2
(45) Date of Patent: Jun. 19, 2018

(54) METHOD FOR PREPARING FOR AND CARRYING OUT THE ACQUISITION OF IMAGE STACKS OF A SAMPLE FROM VARIOUS ORIENTATION ANGLES

(71) Applicant: Carl Zeiss Microscopy GmbH, Jena (DE)

(72) Inventors: Helmut Lippert, Jena (DE); Olaf Selchow, Gera (DE); Pavel Tomancak, Dresden (DE)

(73) Assignee: Carl Zeiss Microscopy GmbH, Jena (DE)

( * ) Notice: Subject to any disclaimer, the term of this patent is extended or adjusted under 35 U.S.C. 154(b) by 244 days.

(21) Appl. No.: 14/412,508

(22) PCT Filed: Jun. 24, 2013

(86) PCT No.: PCT/EP2013/063092
§ 371 (c)(1),
(2) Date: Jan. 2, 2015

(87) PCT Pub. No.: WO2014/005866
PCT Pub. Date: Jan. 9, 2014

(65) Prior Publication Data
US 2015/0153560 A1    Jun. 4, 2015

(30) Foreign Application Priority Data

Jul. 3, 2012 (DE) .......................... 10 2012 211 462

(51) Int. Cl.
*G02B 21/36* (2006.01)
(52) U.S. Cl.
CPC .................................. *G02B 21/367* (2013.01)
(58) Field of Classification Search
None
See application file for complete search history.

(56) References Cited

U.S. PATENT DOCUMENTS 5,485,561 A * 1/1996 Iizuka ................. G01S 7/52063
382/282
8,059,336 B2 11/2011 Ptitsyn et al.
(Continued)

FOREIGN PATENT DOCUMENTS

DE    102007017598 A1    10/2008
EP         1530073 A1     5/2005
(Continued)

OTHER PUBLICATIONS

Von Peter A. Santi, Scientific Paper "Light Sheet Fluorescence Microscopy: A Review," Journal of Hystochemistry and Zytochemistry, vol. 59, p. 129-138, 2011.*
(Continued)

*Primary Examiner* — Edemio Navas, Jr.
(74) *Attorney, Agent, or Firm* — Patterson Thuente Pedersen, P.A.

(57) ABSTRACT

A method for preparing for and carrying out the microscopic recording of image stacks of a sample from various orientation angles, wherein the sample is retained in a sample retainer defining a sample coordinate system. The sample retainer can be translated and rotated in a space spanned by a detection coordinate system. In a first embodiment, for at least two different orientation angles, a projection image is recorded in the detection coordinate system and a first sample volume and a second sample volume are determined in the sample coordinate system. Then the intersection volume of the two sample volumes is determined in the sample coordinate system. Parameters necessary for image stack recording are determined for all other orientation angles based on the intersection volume.

15 Claims, 3 Drawing Sheets

(56) References Cited

U.S. PATENT DOCUMENTS

| | | | |
|---|---|---|---|
| 2004/0207840 A1* | 10/2004 | Sharpe | G01N 21/6458 356/244 |
| 2005/0013478 A1* | 1/2005 | Oba | G02B 21/0024 382/154 |
| 2005/0280818 A1 | 12/2005 | Yamashita et al. | |
| 2006/0033987 A1 | 2/2006 | Stelzer et al. | |
| 2008/0049893 A1 | 2/2008 | Bartzke et al. | |
| 2008/0291533 A1* | 11/2008 | Xu | G02B 21/06 359/389 |
| 2010/0201784 A1 | 8/2010 | Lippert et al. | |
| 2010/0239138 A1 | 9/2010 | Lippert et al. | |
| 2010/0309548 A1 | 12/2010 | Power et al. | |
| 2011/0135053 A1* | 6/2011 | Noordhoek | A61B 6/583 378/11 |

FOREIGN PATENT DOCUMENTS

| | | |
|---|---|---|
| JP | 2004-531729 A | 10/2004 |
| JP | 2005-055879 A | 3/2005 |
| JP | 2006-023476 A | 1/2006 |
| JP | 2008-051802 A | 3/2008 |
| JP | 2010-540994 A | 12/2010 |
| JP | 2010-540996 A | 12/2010 |
| JP | 2010-541023 A | 12/2010 |
| JP | 2011-204243 A | 10/2011 |
| WO | WO 2004/053558 A1 | 6/2004 |
| WO | WO 2005/119575 A2 | 5/2005 |
| WO | WO 2008/125204 A1 | 10/2008 |

OTHER PUBLICATIONS

Uros Krzic, "Multiple-view microscopy with light-sheet based fuorescence microscope," Ph. D. thesis, Jul. 8, 2009.*

Von Peter A. Santi, Scientific Paper "Light Sheet Fluorescence Microscopy: A Review", Journal of Hystochemistry and Zytochemistry, vol. 59, pp. 129-138, 2011.

Uros Krzic, "*Multiple-view microscopy with light-sheet based fluorescence microscope*", Ph.D. thesis, Jul. 8, 2009.

Huisken, J. et al., "Optical Sectioning Deep Inside Live Embryos by Selective Plane Illumination Microscopy", Science, American Association for the Advancement of Science, Washington, DC: vol. 305, Nr. 5686, Aug. 13, 2004, pp. 1007-1009.

Uros Krzic et al., "*Multiview light-sheet microscope for rapid in toto imaging*", Nature Methods, Jun. 3, 2012.

International Search Report for PCT/EP2013/063092, dated Sep. 23, 2013, 4 pgs.

English translation of International Search Report for PCT/EP2013/063092, dated Sep. 23, 2013, 3 pgs.

DE Search Report for 10 2012 211 462.9, dated Apr. 1, 2013, 4 pages.

English translation of DE Search Report for 10 2012 211 462.9, dated Apr. 1, 2013, 5 pages.

Japanese Office Action for Application No. 2015-519011, dated May 30, 2017 and English Translation (Japanese Office Action—8 pgs.; English Translation—3 pgs.) 11 pgs.

\* cited by examiner a) $\alpha_1 = 0°$     b) $\alpha_2 = 90°$ a) $\alpha_1 = 0°$     b) $\alpha_2 = 90°$ a) $\alpha_1 = 0°$   b) $\alpha_2 = 90°$

METHOD FOR PREPARING FOR AND CARRYING OUT THE ACQUISITION OF IMAGE STACKS OF A SAMPLE FROM VARIOUS ORIENTATION ANGLES

RELATED APPLICATIONS

The present application is a National Phase entry of PCT Application No. PCT/EP2013/063092, filed Jun. 24, 2013, which claims priority from DE Application No. 10 2012 211 462.9, filed Jul. 3, 2012, said applications being hereby fully incorporated herein by reference in their entirety.

FIELD OF THE INVENTION

The invention relates to a method for preparing for and carrying out the microscopic acquisition of image stacks of a sample from various orientation angles $\alpha_i$, i=1, ..., N, where N is a natural number, i.e. so-called "multiview" image acquisitions. In such a method, the sample is held in a sample holder. The sample holder itself defines a sample coordinate system $X_P$, $Y_P$, $Z_P$. The sample holder, for its part, can be translated in a space spanned by a detection coordinate system $X_D$, $Y_D$, $Z_D$ and can be rotated about at least one axis of rotation R. Moreover, a detection direction D is predefined which corresponds for example to the optical axis of a detection objective used in a microscopic imaging method. Without loss of generality the at least one axis of rotation R is to lie parallel to the axis $Y_P$ of the sample coordinate system and the detection direction D is to lie parallel to the axis $Z_D$ of the detection coordinate system. Furthermore, the axes $Y_P$ and $Y_D$ are likewise to lie parallel. These specifications only serve to improve the describability and conceivability, they are in no way compulsory. The axis of rotation R can in principle also point in any other direction in relation to the detection or also the sample coordinate system, several axes of rotation can also be provided. However, the outlay on apparatus is higher in these more general cases. The position of the two coordinate systems relative to each other is known, for example it can be determined in advance with the aid of calibration measurements or with reference to device parameters.

BACKGROUND OF THE INVENTION

During the analysis of samples under the microscope, the object often arises of observing the sample from different directions, i.e. at different orientation angles using an optical contrast method, for example using a fluorescence method. This can be advantageous for example when the excitation light and/or the detection light is developed differently for different orientations, i.e. in particular has different intensities, which can be caused for example by scattering processes in the sample. In order to receive a spatial impression of the sample, it has in addition become usual to analyse the sample acquisition by an optical sectioning method, for which an image stack of various parallel planes spaced apart along the detection direction D, the axis $Z_D$, is acquired for each orientation angle. From this image stack, an image of the sample can then be generated which conveys a spatial impression. The sample can be moved, perpendicular to the detection direction D, in the directions $X_D$ and $Y_D$ by a motorized positioning unit. In order to produce the different orientations of the sample, the latter is, as described above, supported rotatable about at least one axis of rotation R.

These so-called multiview acquisitions are also of interest in particular for examining larger samples using a SPIM method (selective/single-plane illumination microscopy). In this method, the sample is illuminated perpendicular to the detection direction D, thus in the $X_D$-$Y_D$ plane here, with a light sheet which can be generated statically or dynamically, the latter for example by point scanning. The observation can be carried out in wide field, with the result that a larger sample region can be captured without, however, the sample fading in a large volume. Not least for this reason, the significance of such SPIM methods has become much more important for the fluorescence microscopy analysis of samples, as can be learnt for example from the article "Light Sheet Fluorescence Microscopy: A Review" by Peter A. Santi, published in the *Journal of Hystochemistry and Zytochemistry*, vol. 59, pp. 129-138 from 2011. The main features of the method are also described for example in WO 2004/053558 A1.

Similarly to confocal laser scanning microscopy, SPIM methods, as wide-field observation methods, allow spatially extended objects to be acquired in the form of optical sections, wherein the advantages consist above all in the speed, the low level of fading of the sample as well as a broadened penetration depth. Unlike conventional fluorescence contrast methods in microscopy using reflected light or transmitted light methods—as examples there may be mentioned here epifluorescence, confocal laser scanning microscopy and multiphoton microscopy—the fluorophores in the sample are excited using laser light in the form of a light sheet or several light sheets. The light sheet can, as already indicated above, be generated by a scanning mechanism, but it can also be generated statically, for example with the aid of a cylindrical lens. As a rule, the sample is held on a positioning unit by a sample holder that can be moved in all spatial directions, in addition the sample holder also has an axis of rotation. The sample can also be supported in a gel, with the result that it cannot be moved compared with the positionable sample holder.

For multiview acquisitions, the sample is rotated and images are acquired from several directions, at several orientation angles. As most applications are to be found in the field of developmental biology, these acquisitions take place at several points in time, which can be distributed over a period of from several hours up to several days. Sometimes the first points in time are of particular interest above all and an effort is made to keep the period of sample preparation in the microscope as small as possible, in order not to miss any important development steps. For this reason, an automation of this type of acquisition is of interest, in particular also as regards the preparation for these acquisitions.

In the state of the art, the following steps are usually carried out for preparing for and carrying out multiview acquisitions.

1. A first orientation angle is set.
2. The positioning unit with the sample holder and the sample is set such that the sample or the sample region of interest moves into the image field region and moreover at least part of the sample is imaged in sharp definition, i.e. the focal plane lies in the sample.
3. In order to define the limits for the acquisition of the image stack in the $Z_D$ direction, a first z position is sought and stored, in which the sample region of interest is located directly in front of or behind the focal plane of the detection objective.
4. A second z position is stored when the positioning unit is set such that the sample region of interest is located directly behind or in front of the focal plane of the detection objective.

5. Both z positions are stored as initial or final parameters together with the orientation angle and the position of the sample in the $X_D$-$Y_D$ plane, with the result that the parameters for defining the image stack are known.
6. Then the next orientation angle is set and steps 2.-5. are repeated.
7. Steps 2-6 are repeated until the desired number of orientation angles has been reached.

At the end there is a set of parameters for defining the coordinates for the acquisition of image stacks along the detection direction D for each orientation angle.

A problem with this method is in particular that of finding the sample region of interest after setting a new orientation angle, in particular in the case of small image field sizes, or in the case of a large distance between the sample and the axis of rotation about which the sample is rotated. Precisely in the latter case, the sample region of interest in some cases also moves out of the region of the image field even in the case of very small angular movements, as the position of the sample changes, due to the rotation, in the direction of the axes $X_D$ and $Z_D$ relative to the focused image field centre, i.e. in relation to the detection coordinate system. The position of the sample holder, i.e. as a rule the motor position of a positioning unit to which the sample holder is attached, must be changed by the amounts $\Delta x$, $\Delta z$ in order to bring the sample back into the focal centre and the image field centre. The reason is that the sample does not, as a rule, lie precisely on the axis of rotation R. It is thereby made much more difficult to prepare for and carry out multiview acquisitions.

An alternative is to observe the sample at a smaller magnification first for preparing for a new image stack acquisition at another orientation angle, with the result that during the rotation the sample no longer moves out of the image field so quickly in the plane perpendicular to the axis of rotation. This can be performed for example by changing the objective on the revolving objective holder, or else by a zoom system independent of the objective and integrated in the illumination beam path. However, this means that an additional work step has to be carried out. The remaining work steps, such as setting each orientation angle and defining the boundary values on the $Z_D$ axis for the stack acquisition, furthermore also have to be carried out.

The automated tracking of the sample table or the sample holder during the rotation offers a certain facilitation, which is, however, only possible when the position of the axis of rotation R, i.e. the position of the sample coordinate system in relation to the position of the detection coordinate system, is known. The entire sample holder and, with it, the sample coordinate system can then be shifted in the detection coordinate system such that the sample remains in the image field, thus the sample holder is tracked translationally. If the position of the axis of rotation in these so-called motor coordinates—i.e. also in the detection coordinate system—is known, the tracking can be determined for each angular movement with the aid of simple transformation matrices, a pure rotation matrix in the most favourable case, and set correspondingly. Even in this case, however, the manual search for the optimal parameters for limiting the image stack in the $Z_D$ direction and for setting each individual angle is not dispensed with.

SUMMARY OF THE INVENTION

The object of the present invention is therefore to make it easier to prepare for and carry out multiview acquisitions, wherein as extensive as possible an automation is regarded as advantageous.

This object is achieved in a method of the type described at the beginning by first acquiring one projection image in the detection coordinate system in each case for at least two orientation angles $\alpha_1$, $\alpha_2$ and determining the parameters necessary for the image stack acquisition with reference to these acquisitions for all orientation angles.

In the acquisition of the projection images the process is as follows: Firstly the first orientation angle $\alpha_1$ is set. Then, in the microscope which is to be used for the acquisition, a sample region to be examined is selected from the sample in a step a). The size of the image field must be chosen such that the sample region to be examined is located, in a projection along the detection direction D, at least partially in the region of the image field, thus it can also be located completely in the region of the image field. The illumination can be carried out in the simplest case by a light source arranged opposite the detection objective of the microscope, as it is sufficient if the outlines of the sample are reproduced only schematically in the image field. In a transmitted light image, this is as a rule already the case when the sample is arranged only approximately in the region of the focal plane and an adequate magnification has been chosen—either with an objective or with a zoom system—in which the sample lies at least partially in the image field. The focal plane of the detection objective need not necessarily lie in the sample. However, it is advantageous in the sense of a simpler capture by an observer if the sample region to be examined is located completely in the volume which is spanned by the edges of the image field on the one hand and the detection axis or the axis $Z_D$ on the other hand. With the aid of a corresponding zoom lens system, this can be set without a great outlay. On the other hand, the sample region to be examined can also be larger than the image field if, for example, a manual setting is carried out.

At this first orientation angle $\alpha_1$, in a step b), a first region of interest $ROI_1$ is defined next which at least partially overlaps with the image field. This region is preferably a section of the image field, if the sample volume is completely captured by the image field in the sense of the projection. During automated determining, this will be the case as a rule, but is not a compulsory prerequisite. Thus, for example, the selection can also be carried out by a user, who inputs corresponding parameters for defining the region of interest, e.g. the centre point and the dimensions, in a particular image section. This inputting can also be carried out if only part of the region to be examined appears in the image field, then the region of interest can also protrude beyond the actually chosen, visible image field. In a corresponding zoom setting, this region of interest ROI1 can also correspond to the whole image field, but often only a section of the image field will be selected as region of interest $ROI_1$, as an overview image of the sample is represented in most cases and it would be too time-consuming to find a best-possible zoom magnification. In the simplest case the region of interest $ROI_1$ is formed box-shaped or circular, but other shapes are also possible for formation as region of interest, such as triangular, square, hexagonal, etc. regions. In principle, any shapes are conceivable. However, it is important that the region of interest can be represented as a geometric object and described mathematically, namely by specifying the coordinates in the detection coordinate system or simple generation rules. Nevertheless it is also conceivable in principle to define a region of interest or a sample region to be examined with a scanning curve, for example when a laser scanning microscope is used, here the trajectory reflects the extent. A manual selection free-hand with a mouse on a screen is likewise conceivable, wherein the region is then defined via the quantity of pixels. However, if the region of interest is formed more simply, the transformation calculations associated with it are nevertheless to be dealt with more simply and more quickly. The selection of the first region of interest $ROI_1$ can be carried out manually by an operator, but also in an automated manner, for example by evaluation of the image intensity recorded with a camera: here the sample should become noticeable in transmitted light by reduced intensity, in the case of darkfield contrast acquisitions on the other hand the intensity should be brighter than the surroundings. Automated methods for structure recognition can also be used. Thus, for example, segmentation algorithms can lead to a relatively complex shape of the first region of interest $ROI_1$.

When the first region of interest $ROI_1$ has been defined, in the next step the position of the image field centre is determined in the detection coordinate system in a plane perpendicular to the detection direction D. This can have for example the coordinates $(x_1^a, y_1^a)$. They describe the current position of the sample table or of the sample holder in detection coordinates, i.e. for example in relation to the optical axis of the detection objective and a plane perpendicular thereto, and can correspond to the motor coordinates of the table or holder. If rotations of the sample holder for example about an axis parallel to the axis $Y_D$ are allowed, the origin of the detection coordinate system for the X direction can be chosen such that the axis of rotation R or the axis $Y_P$ lies precisely at x=0 on the $X_D$ axis.

In the next step d) a set of coordinates is then determined in the detection coordinate system depending on the shape of the first region of interest $ROI_1$. The set of coordinates contains at least as many values as are sufficient for clearly defining the position and the dimension of the first region of interest $ROI_1$ in the image field and thus in the detection coordinate system. In the case of a rectangular region, these can be for example the coordinates which define the corners of the rectangle in the image field. Here three pairs of coordinates in the XY plane of the detection coordinate system would then be necessary for a clear determination, the fourth coordinate can be derived from the other coordinates. Alternatively, the coordinates can also be specified in an equivalent manner in vector notation, wherein the third coordinate specifies the starting point of the vectors. In a further alternative, likewise to be regarded as equivalent, the coordinates indicate in each case the centre point of the rectangle in the detection coordinate system, in the other coordinates values are stored which correspond to the dimensions of the rectangles, i.e. to the width and to the height. The only important thing is that the position and dimensions of the rectangle can be clearly described in the detection coordinate system. In the case of a circular region of interest the specification of the centre point coordinates of the circle and of the radius is sufficient to clearly define the position and the dimensions of this region. For other geometric structures other sets of coordinates can be determined correspondingly.

Finally, in a step e) a first sample volume $V_1$ is determined in the sample coordinate system from the position of the image field centre of the projection image and the set of coordinates which describes the first region of interest $ROI_1$. This first sample volume $V_1$ is determined in the detection coordinate system by the dimensions of the first region of interest $ROI_1$ in the XY plane and perpendicular thereto by the detection direction, thus it is in principle infinite along the detection direction, but in any case very much further extended than in the plane perpendicular to the detection direction D. Via a corresponding transformation matrix which takes into account the position of the sample coordinate system relative to the detection coordinate system, the position and the dimensions of the sample volume $V_1$ can also be indicated likewise in the sample coordinate system. For this, of course, it is a prerequisite that the position of the sample coordinate system relative to the detection coordinate system is known, which can be achieved by a corresponding calibration. The sample coordinate system is coupled to the sample holder, i.e. this rotates or is translated in the detection coordinate system, thus the coordinates of the sample in the sample coordinate system do not change.

When the first sample volume $V_1$ has been determined, the second orientation angle $\alpha_2$ is set. For this, the sample is rotated about the axis of rotation R by the difference between the two orientation angles, $\alpha_2-\alpha_1$, and optionally translated in the detection coordinate system by a value $(\Delta x_R, \Delta z_R)$, if the sample—which is the rule—is no longer located in the image field, with the result that in the case of a projection along the detection direction the sample region to be examined is again located completely in the region of the image field.

Then the previous steps, which are necessary for determining a sample volume, are repeated at the orientation angle, i.e. a second region of interest $ROI_2$ is defined, the position of the image field centre and a set of coordinates for clearly defining the position and dimensions of the second region of interest $ROI_2$ are determined in the detection coordinate system, from which a second sample volume $V_2$ is then determined in the sample coordinate system.

The position of both the first sample volume $V_1$ and the second sample volume $V_2$ in the sample coordinate system is thus known. As the axis of rotation R lies parallel to the axis $Y_P$ in the sample coordinate system and its position in this is known, the position of the two volumes $V_1$ and $V_2$ relative to this axis of rotation R is also known. Both volumes $V_1$ and $V_2$ also contain parts of the sample region to be examined and therefore overlap each other.

Both sample volumes are in principle extended infinitely in one direction. As, however, they both contain the sample region to be examined, which has been enclosed in each case by the $RO_{1,2}$, they overlap in a region which also contains the sample region of interest to be examined. This section volume in which the two sample volumes overlap is now determined in the sample coordinate system. The position of this section volume relative to the axis of rotation R is thus also known. It is particularly advantageous if the difference between the two orientation angles is exactly 90°, as the section volume can then be enclosed best or is smallest.

With reference to this section volume, the parameters necessary for the image stack acquisition are then determined in the sample coordinate system for all orientation angles including the orientation angles $\alpha_1$, $\alpha_2$, i.e. the initial positions and final positions for the stack acquisition along the detection direction. This is transferred into the detection coordinate system in which the sample is positioned correspondingly and the image stack acquisition is carried out in the detection direction, thus in the $Z_D$ direction.

As the position and the dimensions of the section volume in the sample coordinate system are known, these parameters can be calculated without a great outlay and transferred with the aid of the transformation rules into values in the detection coordinate system, wherein the latter is necessary above all for the acquisition of the image stacks in the $Z_D$ direction.

In order to obtain images in sharp definition, it is moreover necessary for it to be known at what position the axis of rotation is located in the image field centre or in the focus, which is predefined for example on the basis of the device parameters or can be determined in a separate calibration step. For piling up the image stack acquisitions or in particular for the previously necessary defining of the parameters for this acquisition, it is no longer necessary for each orientation angle to be set and for the initial and final values for the stack acquisitions to be started up by an operator, rather these parameters are automatically determined with the aid of an evaluation unit.

In a modification of the method, instead of the selection of a second region of interest $ROI_2$ at a second orientation angle, the corresponding volume is determined only with reference to one orientation angle, by also determining the initial and final parameters of a first image stack acquisition at the first orientation angle $\alpha_1$ in addition to the first region of interest $ROI_1$, which can also be formed rectangular here. As already mentioned above, this is the defining of the limits in the $Z_D$ direction, i.e. two z positions between which the first region of interest $ROI_1$ is located. This initial and final position of the first image stack acquisition can, as known in the state of the art, be defined manually. Alternatively, an automated determination is also possible, for example with the aid of an evaluation of the sharpness of individual images. From these two parameters, as well as from the first region of interest $ROI_1$, a sample volume $V_P$ is then determined. As both the first region of interest $ROI_1$ and the distance between initial and final parameter are finite, the sample volume $V_P$ is also already finite, therefore the determination of a section volume can be dispensed with in this case. For the further orientation angles the parameters necessary for the acquisition of further image stacks are then determined in the sample coordinate system with reference to the sample volume $V_P$ by means of the transformation rules. In this modified method the sample is then also positioned correspondingly in the detection coordinate system. Finally, the image stack acquisition is carried out.

In both variants, the sample can also be supported rotatable about several axes, this can be taken into account correspondingly in the transformation matrix. In addition, it can be advantageous if the plane in the image field, i.e. the image field plane, already corresponds to the focal plane, as then the position of the axis of rotation relative to the focal plane can also be determined directly. The determination of the section volume can take place automated as far as possible, i.e. without interventions by a user, if the image capture takes place automated, if the operator has indicated the desired orientation angles and increments at the start. It is also conceivable to define the increments and orientation angles in an automated manner, and this often makes sense in the case of the increments if the initial plane and the final plane for the stack acquisitions have different distances at different orientation angles. In addition, the two orientation angles $\alpha_1$ and $\alpha_2$ need not necessarily also be such orientation angles at which the image stack acquisitions are to take place.

In a particularly preferred embodiment of the method, the acquisition of image stacks takes place within the framework of a microscopic sample analysis, during which the sample is illuminated with a light sheet, the expansion plane of which lies substantially perpendicular to the detection direction. In particular the increment information can also be determined here with reference to the magnification used and the light sheet parameters linked to this. In other microscopy methods the depth discrimination can also be used as a parameter for this.

A particular case is also present in the use of scanning microscope methods in which the dimensions of the image currently being acquired are not determined by camera parameters, but by scanning parameters. The outlines of the sample volume—based on the section of the region of interest—can be designed very complex here, as any shapes can in principle be recreated with a scanner. As, however, the scanning movement is known, the outlines can also be described mathematically with reference to the movement curve.

Of course, it is also conceivable that more than two projection images are acquired to determine the section volume, i.e. more than two orientation angles are set for acquiring the projection images. This can be advantageous for example when the determination of the section volume is to take place with high precision, as the information which results if three and more orientation angles are used is partially redundant.

It is understood that the features mentioned above and those yet to be explained below can be used not only in the stated combinations but also in other combinations or alone, without departing from the scope of the present invention.

BRIEF DESCRIPTION OF THE DRAWINGS

The invention is explained in further detail below by way of example with reference to the attached drawings which also disclose features essential to the invention. There are shown in.

DETAILED DESCRIPTION OF THE DRAWINGS

Figure 1:
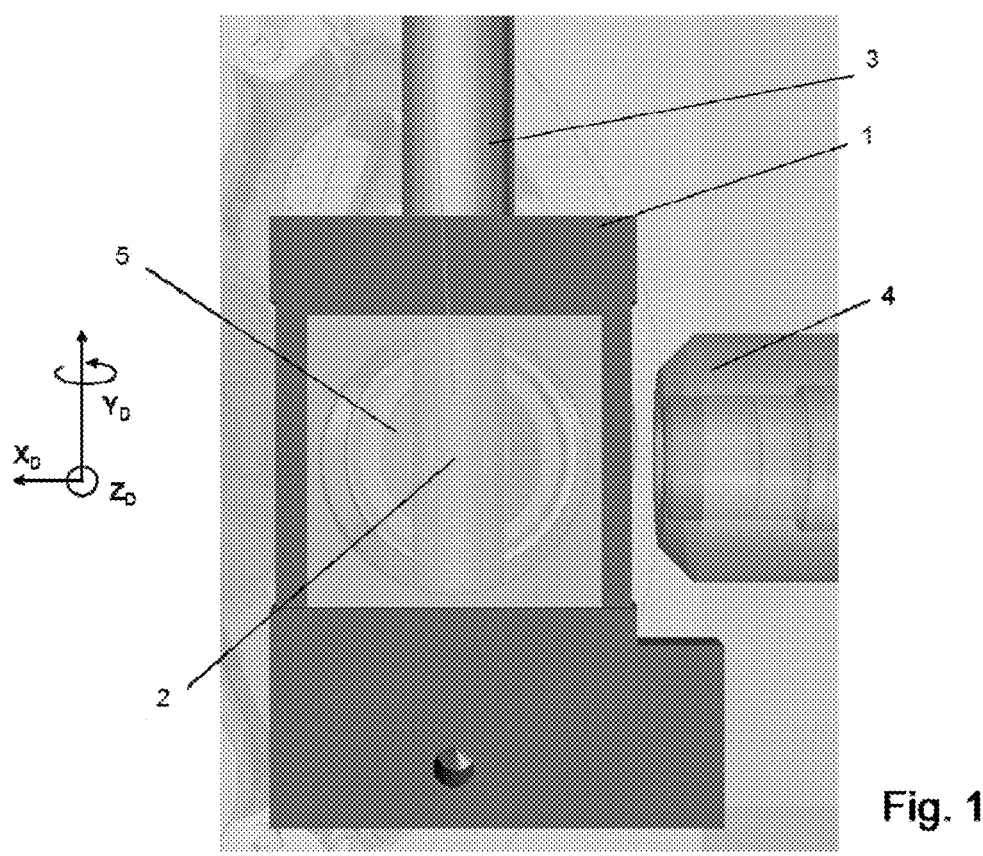
FIG. 1 a typical structure of a microscope suitable for the SPIM method.

The structure of a microscope system for a sample analysis is firstly shown in FIG. 1, in which system the sample can be illuminated with a light sheet, wherein the expansion plane of the light sheet lies substantially perpendicular to the detection direction, the analysis of the sample takes place using the so-called SPIM method. A sample 2 embedded in a gel such as for example agarose is supported in a sample chamber 1. The sample chamber 1 is mounted on a sample holder 3. The sample chamber 1, and thus the sample 2, can be rotated about the axis of the sample holder 3, which here corresponds to the Y axis of a detection coordinate system, $Y_D$, and can be translated in all three spatial directions. This detection coordinate system is drawn in on the left, the rotatability about the $Y_D$ axis is symbolized by the circular arrow. The sample holder 3, for its part, spans a sample coordinate system with the axes $X_P$, $Y_P$, $Z_P$. In the present case the axes $Y_D$ and $Y_P$ lie parallel, with the result that when the sample coordinate system is rotated compared with the detection coordinate system only the angles between the axes $X_P$ and $X_D$ or $Z_P$ and $Z_D$ change. This makes representation easier in the present case, but is not a compulsory prerequisite. In other structures a rotation of the sample about other axes or about several axes can absolutely also be realized.

In SPIM technology the light sheet is generated in the $X_D$-$Y_D$ plane, in the present case an illumination objective 4 is used for this. The light sheet can be generated statically, for example using a cylindrical lens, or else dynamically or quasi-statically with the aid of a point scanning of the sample along a line. For the latter, for example scanning devices known from laser scanning microscopy can be used. The detection takes place along a detection direction G which lies parallel to the axis $Z_D$, a detection objective 5 is provided for this. The position of the sample coordinate system relative to the detection coordinate system is known via a calibration or with the aid of the knowledge of the machine parameters for positioning the sample chamber 1 over the sample holder 3. The position of the axis of rotation $Y_P$, also denoted R, in respect of the focal plane of the detection objective 5 can be determined in advance by calibration or with reference to the machine parameters. Because of the rotatability of the sample holder 3, and thus the sample chamber 1, this structure is particularly well suited to so-called multiview acquisitions, wherein image stacks are acquired from several orientation angles $\alpha_i$, i=1, . . . , N, where N is a natural number.

Figure 2:
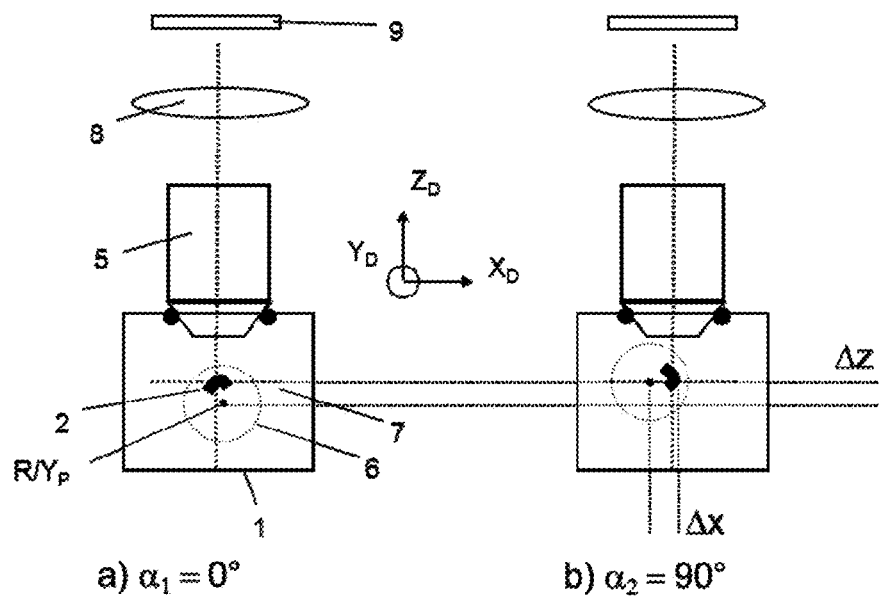
FIG. 2 the shift of the sample in the detection coordinate system when rotated for repeated focusing at a new orientation angle, FIG. 3 the determination of sample volumes for two orientation angles in a top view of the sample space and FIG. 4 the determination of these sample volumes in the image field.

The basic procedure when acquiring such image stacks from various orientation angles is represented by way of example in FIG. 2 for two orientation angles. The situation for an orientation angle $\alpha_1=0°$ is represented in FIG. 2a) and for an orientation angle $\alpha_2=90°$ in FIG. 2b). The viewing direction perpendicular to the sheet plane corresponds to the axis $Y_D$, which is parallel to the axis of rotation $Y_P$ of the sample holder 3 and thus of the sample chamber 1 and of the sample 2. The sample 2 is embedded in an agarose cylinder 6, but does not lie centrally on the axis of rotation $Y_P$. In FIG. 2a), for the orientation angle $\alpha_1=0°$, the sample 2 is arranged at least partially in the focal plane 7 of the detection objective 5, which, however, is not compulsory. It is sufficient if the focal plane is located close to the image plane or light sheet plane, as long as the outlines of the sample or of a sample region to be examined are recognizable, the image field plane can also advantageously correspond to the focal plane. Via the imaging lens system 8, the image of the sample 2 is projected onto a detection unit which here comprises for example a spatially resolving surface detector in the form of a CMOS or CCD camera chip 9.

For each setting of the orientation angle, in the state of the art image stacks are usually acquired along the $Z_D$ axis, for which the sample 2 is shifted along the detection axis D parallel to this axis. For this, initial and final positions are determined in the sample coordinate system, the sample chamber 1 on the sample holder 3 is then moved correspondingly along the detection direction D by a controllable positioning unit.

For another orientation angle, in the example $\alpha_2=90°$, the sample has to be rotated about the $Y_P$ axis by precisely this angle. Usually, and in particular in the case of large magnifications, the sample 2 then already moves out of the image field, as the x and z coordinates of the sample 2 in the detection coordinate system, i.e. relative to the focused image field centre, change due to the rotation. The motor position, i.e. the position of the sample holder 3 or of the sample chamber 1, then has to be translated by the amounts $\Delta x$, $\Delta z$ in order to bring the sample 2 back into the focused image field centre. In other words, because of the distance between sample 2 and axis of rotation R, which corresponds to the axis $Y_P$, the sample 2 has to be tracked in order to receive it back in the focal plane and in a region of overlap with the detection D. While in methods used in the state of the art the sample tracking has to take place for each newly set orientation angle, in the method described below with reference to FIGS. 3 and 4 it is sufficient to carry out particular steps at only two orientation angles from which the parameters can then be derived for the image stack acquisitions for these and further orientation angles. If the possibility exists of observing the sample 2 from several viewing angles simultaneously, for example with a SPIM microscope which is equipped with several detection objectives 5, then the method steps described below can also be carried out simultaneously for both orientation angles $\alpha_1$ and $\alpha_2$. In order to improve the precision of the method, more than two orientation angles can also be measured initially.

Figure 3:
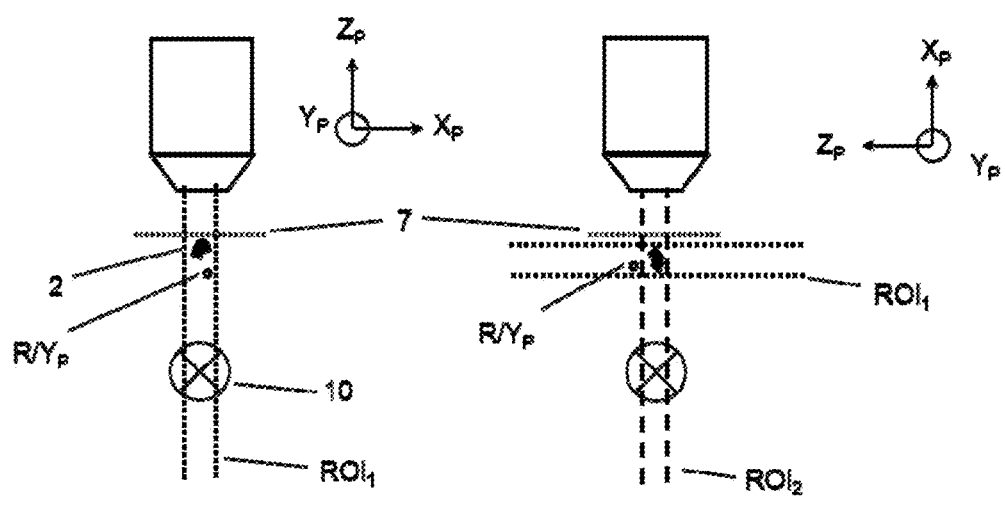
Figure 4:
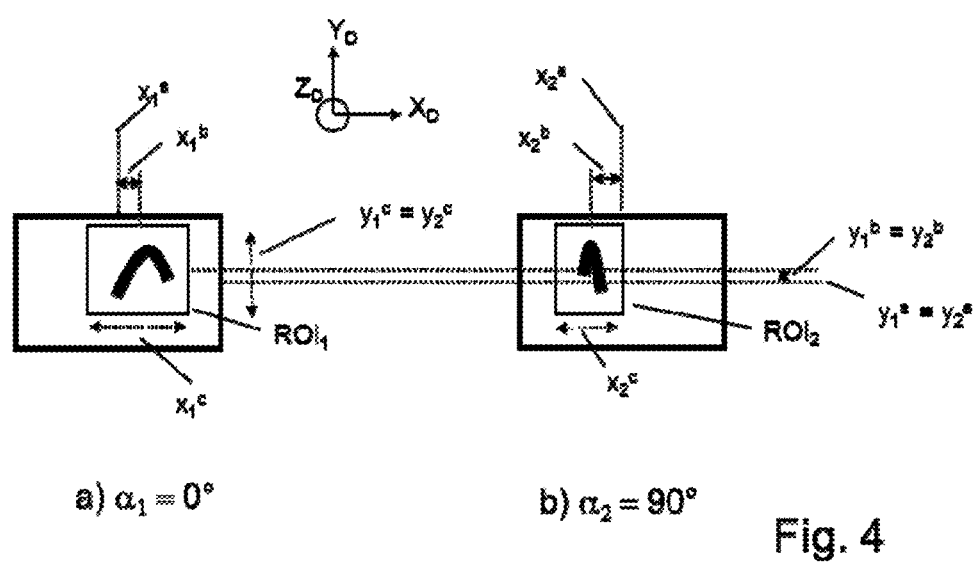

In the simplest case the illumination of the sample 2 takes place, as indicated in FIG. 3, via a light source 10 which is arranged opposite the detection objective 5 and can be designed for example connectable in the case of a SPIM microscope. Firstly one projection image is acquired in the detection coordinate system in each case for the at least two orientation angles, wherein these acquisitions can also take place simultaneously, as already mentioned above. For this, in a step a) a sample region to be examined is first selected, wherein the size of an image field is chosen such that the sample region to be examined is located in the case of a projection along the detection direction D at least partially in the region of the image field, which is important for the determination of the acquisition parameters for the image stacks from other directions. In the example shown it is even located completely in the image field. It is sufficient if the sample outlines are reproduced only schematically, which is the case as a rule in a transmitted light image, if the sample 2 is already arranged approximately in the region of the focal plane 7 and an adequate magnification has been chosen. A zoom system can be used for setting the magnification, as can an appropriate detection objective. In FIG. 4 the image field is indicated in each case by the outer rectangle shown thicker.

Of course, a conventional image stack acquisition, from which a projection image is then derived, can also already take place here as required. Instead of a transmitted light illumination, as outlined in FIG. 3, all other possible contrast methods can also be used, for example also fluorescence methods. In a step b) a first region of interest $ROI_1$ is then defined which overlaps at least partially with the image field. In the example shown, the region of interest $ROI_1$ is a section of the image field. This can be carried out for example by the operator, by marking a region of interest on the image. The regions of interest for the two selected orientation angles are represented as rectangles inside the image field in FIG. 4, wherein, however, all other structures that can be described geometrically with simple formulae, such as circles or polygons, are also conceivable. The defining of the section of the image field can also take place automated with the aid of image processing methods which analyse for example the contrast. The regions of interest $ROI_1$ and $ROI_2$ can also correspond to the complete image field or also assume complex shapes.

As it is a projection image, the region of interest $ROI_1$ or $ROI_2$ actually also has a third dimension which, in the representation chosen in FIG. 4, lies in each case in the direction of the detection axis D or the axis $Z_D$, which, however, likewise enclose an angle of 90° with each other in the sample coordinate system at the chosen orientation angles, as shown in FIG. 3.

In order now to be able to describe the position of the two regions of interest relative to each other in the sample coordinate system and set them in relation to each other, the position of the image field centre is first determined in the detection coordinate system in a plane perpendicular to the detection direction D. In FIG. 4 the image field centre corresponds to the coordinates $x_1^a$, $y_1^a$ and $x_2^a$, $y_2^a$, in FIG. 4a) and FIG. 4b) respectively. If the axis of rotation is parallel to the $Y_D$ axis, $y_1^a$ and $y_2^a$ are identical. This does not apply to the x coordinates, because, as already described in connection with FIG. 2, a shift of the sample takes place in order to bring it back into the image field.

The difference in the x coordinates in the detection coordinate system thus corresponds to the shift of the sample holder 3 along the $X_D$ direction in the detection coordinate system. The shift in the $Z_D$ direction does not become noticeable directly in the image field, except by a focusing possibly to be newly set, if necessary.

Depending on the shape of the regions of interest $ROI_1$ and $ROI_2$ a set of coordinates is determined in the detection coordinate system, which set of coordinates is sufficient to clearly define the position and the dimension of this region of interest in the image field and thus in the detection coordinate system. In the case of the rectangular regions of interest $ROI_1$ and $ROI_2$ shown here, these are the coordinates $x_1^b$ and $y_1^b$ as well as $x_2^b$ and $y_2^b$, which specify the central position of the respective region of interest in the image field, and the values $x_1^c$, $y_1^c$ as well as $x_2^c$, $y_2^c$, which reflect the dimensions of the regions of interest in the image field and thus in the detection coordinate system. In an automatic marking the y coordinates are as a rule identical if the axis of rotation R lies parallel to the $Y_D$ axis, in manual marking these values will as a rule differ from each other.

Other types of coordinate definition are also possible, for example by specifying the corner coordinates of the rectangles or by specifying one corner and two vectors. In each case the set of coordinates must be sufficient to define the position of the dimensions of the respective region of interest in the image field, it can also be over-determined.

From these values, i.e. the position of the image field centre of the projection image and the set of coordinates, a first sample volume $V_1$ and a second sample volume $V_2$ are now determined in the sample coordinate system by means of corresponding transformation and taking into account that the regions of interest $ROI_1$ and $ROI_2$ in FIG. 4 have an extent different from zero, i.e. a finite or even infinite extent, along the detection direction D because of the projection. The volume extends in FIG. 4 in each case perpendicular to the image plane and is box-shaped, in FIG. 3 the actual position of the two regions of interest or of the sample volumes is represented taking into account the transformation in the sample coordinate system. This relative position of the two regions of interest $ROI_1$ and $ROI_2$ relative to each other comes about because the sample 2 is rotated between the two definitions of the regions of interest by the difference between the two orientation angles and is translated in the detection coordinate system by amounts $\Delta x$, $\Delta z$, if the sample 2 is not located back in the image field after the rotation such that the sample region to be examined is located completely back in the region of the image field after the translation. From the position of the two regions of interest $ROI_1$ and $ROI_2$, which define the volumes $V_1$ and $V_2$, a section volume of these two volumes can now be determined in the sample coordinate system, by then knowing the position of the section volume relative to the axis of rotation R, i.e. the axis $Y_P$.

With reference to this section volume, the parameters necessary for the image stack acquisition can then be determined in the sample coordinate system for these orientation angles as well as for the other orientation angles. The sample is then positioned correspondingly in the detection coordinate system and the image stack acquisition is carried out. The parameters necessary for the image stack acquisition comprise the start and the end of the image stack acquisition in the $Z_D$ direction as well as the positioning in the $X_D$ direction for each orientation angle. If the position of the two coordinate systems relative to each other is known, it is also known at what position of the sample holder 3 the axis of rotation R is located in the image field centre or in the focus, from which the position of the volumes of interest can be determined from the ROI relative to the focal plane. From the knowledge of the image centre position, the position of the corresponding volume relative to the position of the axis of rotation can be determined.

Alternatively, the selection of a second region of interest $ROI_2$ can also be avoided by determining at the first orientation angle $\alpha_1$, in addition to the first region of interest $ROI_1$, the initial and final parameters of a first image stack acquisition at this orientation angle. Together with the first region of interest $ROI_1$ a finite sample volume $V_P$ is determined in this way, there is no longer any need to determine a section volume. For the further orientation angles the parameters necessary for the acquisition of further image stacks are then determined in the sample coordinate system with reference to the sample volume $V_P$ by means of the transformation rules. In this modified method the sample is then also positioned correspondingly in the detection coordinate system. Finally, the image stack acquisition is carried out. By means of a corresponding calibration the transformation rules for transformation between sample coordinate system and detection coordinate system are determined in advance. If the position of the sample volume $V_P$ in the detection coordinate system is known for an orientation angle, it is thus also known in the sample coordinate system and can moreover be determined in the detection coordinate system for every desired orientation angle.

The elaborate piling up of multiview acquisitions by hand is dispensed with in this way, which is of great advantage in particular in the case of developmental biology observations, which can last several days.

The invention claimed is:

1. A method for preparing for and carrying out the microscopic acquisition of image stacks of a sample from various orientation angles (ai), where i=1, . . . , N, and where N is a natural number, the method comprising:
   prior to acquisition of the image stacks the following preparation steps for determining a section volume:
   placing the sample in a sample holder, defining a sample coordinate system ($X_p$, Yp, Zp) in the sample holder, wherein the sample holder can be translated in a space spanned by a corresponding detection coordinate system ($X_D$, $Y_D$, $Z_D$) and can be rotated about at least one axis of rotation parallel to the axis (Yp) of the sample coordinate system, and wherein a detection direction lies parallel to the axis ($Z_D$) and the position of the two coordinate systems relative to each other is known;
   acquiring a projection image for at least two orientation angles (al, a2) in the detection coordinate system along the detection direction, the projection image being generated by illuminating the sample, and as the first orientation angle (al) is set;
   a) selecting a sample region to be examined, wherein the size of an image field is chosen such that the sample region to be examined is located, in a projection along the detection direction, at least partially in the region of the image field;
   b) at the first orientation angle (al) defining a first region of interest which overlaps at least partially with the image field;
   c) determining the position of the image field centre in the detection coordinate system in a plane perpendicular to the detection direction;

d) determining a set of coordinates in the detection coordinate system depending on the shape of the first region of interest, wherein the set of coordinates is sufficient to clearly define the position and the dimensions of the first region of interest in the image field and thus in the detection coordinate system;
   e) determining a first sample volume in the sample coordinate system from the position of an image field centre of the projection image, from the set of coordinates, and from coordinates in the detection direction perpendicular to the first region of interest;
   setting the second orientation angle (a2) and rotating the sample about the at least one axis of rotation by the angular difference between the two orientation angles, (a2−a1), and wherein the sample is optionally translated in the detection coordinate system so that the sample region to be examined is located at least partially in the region of the image field;
   performing steps a) to d) at the second orientation angle (a2), defining a second region of interest, and determining the position of the image field centre, a further set of coordinates in the detection coordinate system and a second sample volume;
   determining a section volume in which the two sample volumes overlap; and
   after the section volume has been determined,
   determining the parameters in the sample coordinate system for image stack acquisition for the orientation angles (ai) with reference to the section volume, including initial and final positions for the stack acquisition along the detection direction for each orientation angle (ai) and the position of the section volume relative to the axis of rotation;
   positioning the sample correspondingly in the detection coordinate system, and carrying out the image stack acquisition for each orientation angle (ai).

2. The method of claim 1, wherein the regions of interest, are rectangular, and coordinates $(x1^b, y1^b)$, $(x2^b, y2^b)$ in each case specify the centre point of the rectangle in the detection coordinate system, and in each case the dimensions of the rectangles are stored in coordinates $(x1^c, y1^c)$, $(x2^c, y2^c)$.

3. The method of claim 1, wherein the difference between the orientation angles, is 90°.

4. A method for preparing for and carrying out the microscopic acquisition of image stacks of a sample from various orientation angles (αi), where i=1, . . . , N, and where N is a natural number, the method comprising:
   prior to acquisition of the image stacks the following preparation steps for determining a first sample volume:
   placing the sample in a sample holder, defining a sample coordinate system $(X_P, Y_P, Z_P)$ in the sample holder, wherein the sample holder can be translated in a space spanned by a corresponding detection coordinate system $(X_D, Y_D, Z_D)$ and can be rotated about at least one axis of rotation parallel to the axis $(Y_P)$ of the sample coordinate system, and wherein a detection direction lies parallel to the axis $(Z_D)$ and the position of the two coordinate systems relative to each other is known;
   acquiring a projection image for at least one orientation angle (α1) in the detection coordinate system along the detection direction, the projection image being generated by illuminating the sample, and as the first orientation angle (α1) is set;
   a) selecting a sample region to be examined, wherein the size of an image field is chosen such that the sample region to be examined is located, in a projection along the detection direction, at least partially in the region of the image field;
   b) at the first orientation angle (α1) defining a first region of interest which overlaps at least partially with the image field;
   c) determining the position of the image field centre in the detection coordinate system in a plane perpendicular to the detection direction;
   d) determining a set of coordinates in the detection coordinate system depending on the shape of the first region of interest, wherein the set of coordinates is sufficient to clearly define the position and the dimensions of the first region of interest in the image field and thus in the detection coordinate system;
   e) determining the initial and final parameters of a first image stack acquisition at the first orientation angle (α1);
   f) determining a first sample volume in the sample coordinate system from the position of the image field centre of the projection image, from the set of coordinates and from the initial and final parameters of the first image stack acquisition and
   after the first sample volume has been determined,
   determining parameters necessary for the acquisition of further image stacks in the sample coordinate system for the further orientation angles (αi) with reference to the sample volume, including initial and final positions for the stack acquisition along the detection direction for each further orientation angle (αi), positioning the sample correspondingly in the detection coordinate system, and carrying out the image stack acquisitions for each orientation angle (αi).

5. The method of claim 4, wherein the region of interest is rectangular, and coordinates $(x1^b, y1^b)$ specify the centre point of the rectangle in the detection coordinate system, and the dimensions of the rectangle are stored in coordinates $(x1^c, y1^c)$.

6. The method of claim 1, wherein the plane in the image field corresponds to the focal plane.

7. The method of claim 1, wherein the position of the axis of rotation relative to the detection coordinate system is determined in a calibration step preceding the acquisition.

8. The method of claim 1, wherein the acquisition of image stacks takes place within the framework of a microscopic sample analysis, during which the sample is illuminated with a light sheet, an expansion plane of which lies perpendicular to the detection direction.

9. The method of claim 1, wherein the determination of the section volume takes place automated.

10. The method according to claim 4, wherein the plane in the image field corresponds to the focal plane.

11. The method of claim 4, wherein the position of the axis of rotation relative to the detection coordinate system is determined in a calibration step preceding the acquisition.

12. The method of claim 4, wherein the acquisition of image stacks takes place within the framework of a microscopic sample analysis, during which the sample is illuminated with a light sheet, an expansion plane of which lies perpendicular to the detection direction.

13. The method of claim 4, wherein the determination of the section volume takes place automated.

14. The method of claim 1, wherein the projection images are generated by transmitted light illumination.

15. The method of claim 4, wherein the projection images are generated by transmitted light illumination.

\* \* \* \* \*